T. L. CARBONE.
RESILIENT TIRE.
APPLICATION FILED OCT. 4, 1913.
1,189,789.
Patented July 4, 1916.
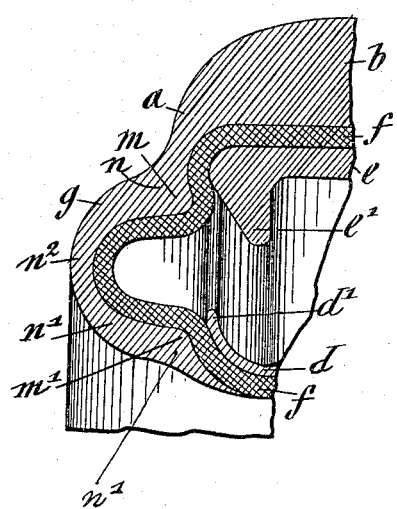
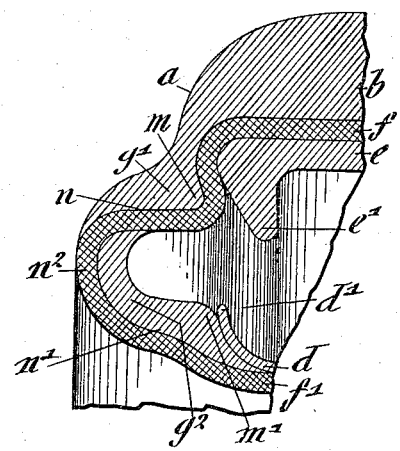
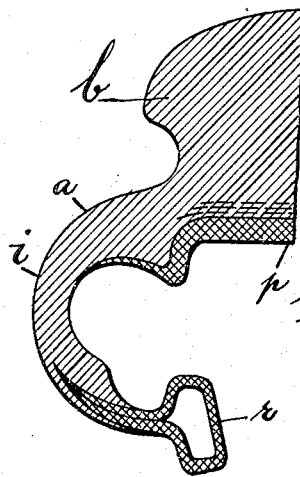
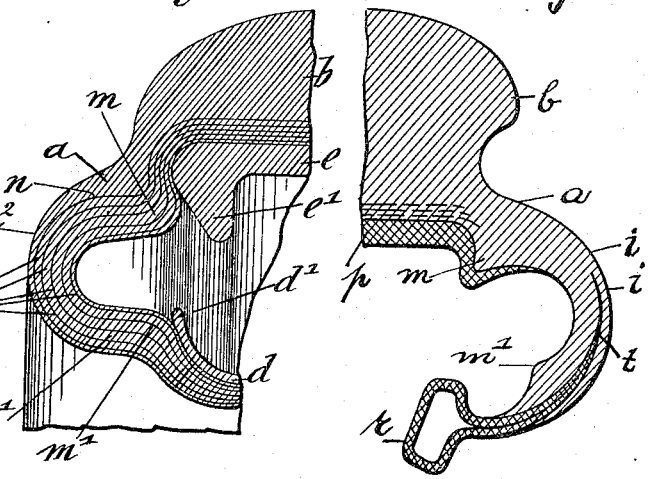
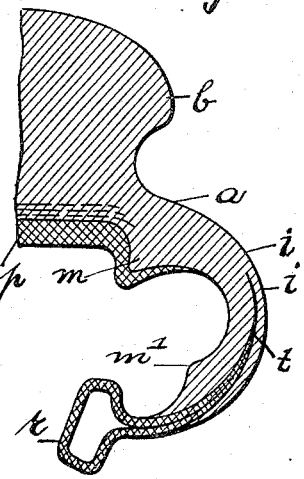
Witnesses:
F. Hogg.
G. Lowe.
Inventor
Tito Livio Carbone
By his Attorney
Carl P. Goepel.

UNITED STATES PATENT OFFICE.

TITO LIVIO CARBONE, OF CHARLOTTENBURG, GERMANY.

RESILIENT TIRE.

1,189,789.  Specification of Letters Patent.  Patented July 4, 1916.

Original application filed February 12, 1910, Serial No. 543,525. Divided and this application filed October 4, 1913. Serial No. 793,313.

*To all whom it may concern:*

Be it known that I, TITO LIVIO CARBONE, a citizen of the Swiss Republic, and a resident of Charlottenburg, near Berlin, Germany, have invented certain new and useful Improvements in Resilient Tires, of which the following is a specification.

This is a divisional application of my copending application filed by me on February 12th, 1910, under Serial No. 543,525.

This invention, as also the invention just referred to, relates to resilient tires of the kind wherein rigid rings are connected with each other. Because of the rigidity of these rings, the resiliency of the tires takes up substantially all the vibration and the like.

The object of the invention is to provide a tire which does not have the objectionable features of tires hitherto in use, and in consequence has long life and resiliency.

The invention consists in providing an elastic connection intermediate the rings so arranged that it readily permits a certain movement of the rings toward and from each other, but which is sufficiently resistant to offer an elastic resistance to a further movement of the rings in the same direction, at the same time tending to maintain the rings normally spaced apart, so that said connection has a permanent mean normal shape.

More particularly the invention consists of a connection for resilient tires connecting normally spaced rigid rings and having outwardly bent folds around the circumference at both sides of the rings, vulcanized to permanent mean normal shape laterally bent outwardly with respect to the central plane of the rings, which outer folds when distorted in any direction, react simultaneously throughout the circumference of the rings to return to initial position.

In the embodiment shown in my co-pending application Serial No. 793,312 in which the inwardly-bent folds are shown, it sometimes happens on the approach of the rings at portions of the tires, that the folds are pressed against the strengthening ribs of the rigid rings and the material forming the peak is crowded against the ribs. To obviate this feature, the folds, according to the present invention, are bent outwardly, and no matter how much the rings approach or recede from each other, a free movement is given to the folds and no injurious compression of the cover results.

The invention consists of other novel features and combinations of parts hereinafter set out and claimed.

In the accompanying drawings, Figure 1 represents a vertical transverse section through a tire embodying the invention, showing the tire in its normal unloaded condition, the said figure showing only a fragmentary section, Fig. 2 is a similar view, also fragmentary, showing the rubber and fabric alternating, the rubber being exterior to the fabric in one part, and the other portion of the fabric being exterior to the rubber in the other part, Fig. 3 is also a similar view, also fragmentary, showing the rubber provided with spaced fabric layers, Fig. 4 is a similar view without the rings, and showing the fold made of rubber, and Fig. 5 is a similar fragmentary view without the rings and with the folds having an upper shoulder, and another shoulder extending up from the bead.

Similar letters of reference indicate corresponding parts throughout the various figures.

Referring to the drawings, and more particularly to Fig. 1, the cover $a$ is provided integrally with a tread $b$, and with an inner ring $d$, rigid and pressed out of sheet steel or the like. The inner ring $d$ has a curved side part $d^1$, which part acts to stretch the cover and hold it in position, and the ring is known as a stretching-ring. An outer ring $e$ is arranged within the cover and has a strengthening rib $e^1$, this outer ring acting as a floating ring. The cover is made of a rubber layer $g$ and a fabric layer or layers $f$, forming a connection between the rings $e$ and $d$, which consists of lateral members $n$ and $n^1$, joined integrally at $n^2$. The fabric layer or layers follow the shaping of the rubber layer. The member $n$ is provided with an enlargement $m$, which acts as a cushion when that portion of the cover is pressed against the strengthening rib $e^1$, and the member $n^1$ is provided with an enlargement $m^1$ which acts as a cushion when it is pressed against the part $d^1$.

In the embodiment shown in Fig. 1, in which the fabric layer $f$ is within the outer rubber layer, the lateral sides of the cover are formed into an outwardly extending fold with the bend directed outwardly of the outer part of the rings, and with the open part facing the interior of the tire. Such folds are provided at both sides of the rings and extend unbrokenly circumferentially around the same, being bent laterally outwardly with respect to the central plane of the rings. The folds are vulcanized to a permanent mean normal shape and when distorted in any direction from this shape by the relative movement of the outer ring with respect to the inner ring, always react to return to initial position. The lateral walls of the cover which form the improved connection in the form of an outward fold in this embodiment are normally curved outward as shown in Fig. 1.

In the embodiment shown in Fig. 2, the stretching ring $d$ has the curved sides $d^1$ and the floating ring $e$ has the strengthening rib $e^1$. The cover $a$ is again provided with a thread $b$ and has the member $n$ and member $n^1$ joining at $n^2$. Cushioning devices $m$ and $m^1$ are also provided which act in the same manner, as described in connection with Fig. 1.

In the embodiment shown in Fig. 2, the fabric layer $f^1$ is within the tread portion $b$ of the cover and without the wheel rim portion of the cover. The fabric layer $f^1$ is given the necessary shape to surround the rings and has rubber layers $g^1$ and $g^2$, so that these, with the fabric layer form a permanent fold vulcanized to a permanent mean normal shape, which when distorted in any direction from this shape by the relative movement of the stretching ring with respect to the floating ring, always react to return to initial position.

In the embodiment shown in Fig. 3, the stretching ring $d$ with its curved portion $d^1$, floating ring $e$ with its strengthening rib $e^1$, cover $a$ with its tread $b$, members $n$ and $n^1$ joining at $n^2$ are substantially like the same parts in Figs. 1 and 2. The cushions $m$ and $m^1$ are also substantially the same. Instead of providing a single layer of fabric as shown by $f$ in Fig. 1, and $f^1$ in Fig. 2, a plurality of spaced layers $h$ are provided, which are clearly shown in Fig. 3.

In Fig. 4, a cover $a$ with its tread $b$ is again shown, but which has a fabric protecting portion $p$ made of fabric, and the bead $r$ of the cover is also protected by fabric. The rings are not shown in this view, but the outwardly extending fold is shown and indicated by $i$. The portion of the fold between $p$ and $r$, undergoes the preliminary and also the greatest distortion, whereby collapse of the fold against the rings is prevented, and the upper and lower fabric shoulders do not become forced into the same straight line.

In the embodiment shown in Fig. 5, which is like that of Fig. 4, in respect to the tread $b$, fold $i$, bead $r$ and protecting layer $p$, a layer $t$ of fabric extends upwardly, and stiffens the fold, to the distance shown in Fig. 5. The operation of the cover shown in this view is substantially like that described in my co-pending application, and is as follows: The embodiments shown in the drawings are made of suitable rubber or other elastic material, suitable fabric, etc., and vulcanized into shape to conform to an initial natural position sufficiently resistant in proportion to the weight and driving torque to be distorted only within the elastic limit in any direction by the operative movement of the rings relative to each other and sufficiently strong to return to substantially initial or unstrained state. As, in the embodiments, the connection is arranged along the circumference of the rings, it reacts simultaneously at portions thereof to return the displaced parts to initial position and thereby returns the rings to a position substantially concentric with each other. An elastic resistance of tension and twisting to the flattening of the fold is created and a displacement of the extremities of the fold does not produce a permanent yield.

The weight, being a vertical force, may be divided at every radius of the wheel, into two components, one parallel and one perpendicular to the radius. At the top and bottom of the tire, this stress is entirely in the direction of the vertical diameter, and at the portions of the tire on the horizontal diameter, this stress is entirely perpendicular to said horizontal diameter. The component in the direction of the radius thus varies from zero to a maximum in every quadrant of the tire, and the same is correspondingly true of the component perpendicular to the radius.

The strain, similarly, has two components, one in the direction of the radius, that elongates or compresses the connection between the rings, thereby changing the interradial dimensions and a component perpendicular to the radius, of a bending or twisting nature. These component strains vary from zero to a maximum, like the stresses producing them. The driving torque of the vehicle produces a uniform peripheral strain, perpendicular to the radii, which strain may be very great in a high powered vehicle.

The fold is an advantageous form for affording a maximum of vertical elastic play, with a minimum of strain, because the elongation or compression of its members is less than the corresponding displacement of the rings, since the stresses produce a bend or twist instead of only tension and compression. By giving portions of the fold, preferably those adjacent the ring, a relative vertical rigidity, the bend of these rigid members is limited, and the fold is prevented from collapsing into a plane surface. The center of the fold is made preferably weaker than the upper and lower members thereof, so that this center undergoes the initial and the greatest distortion, affords a limited elastic play for small shocks, while the relative rigidity of the other members of the fold restrain the free elastic play within certain limits. It is sometimes desirable to make a part of the fold adjacent a ring absolutely rigid, and rigidly connected thereto, so as to prevent a collapse of the fold, and confine the play to the parts laterally situated with respect to the central plane.

The desired relative elasticity at portions of the fold is preferably secured by means of stiffening fabric integral with the fold, said fabric being discontinuous or weaker at the points of greatest elasticity.

The fold is an advantageous form for giving an elastic play to the stresses that are peripheral, or tangential to the tire because the reaction, being of a twisting or bending nature, has the upper and lower members of the fold as lever arms, and hence only a small strain is necessary to produce a large reacting moment. If parts of the fold are made of great transverse rigidity, so that they are not distorted by the tangential stresses, the yield of the fold can be limited and confined to certain portions. The preferable form is where the upper and lower members are of great transverse rigidity with an elastic center. Then, since the elastic portion between the rigid twisting members is small, the strain caused by the said twisting members, moved by the rings, is correspondingly small. The twisting reaction being at the extremity of the fold farthest away from the central plane of the rings, has the entire length of the upper and lower rigid members as lever arms.

It is not necessary that the tread be integral with the tire, but this is a convenient way of connecting the tire with the floating ring. This is accomplished by making the floating ring of larger external dimensions than the corresponding interior portion of the tire. This ring, when forced into the tire, separates the elastic walls, whose reaction produces a frictional grip upon the said ring. Again, when the elastic material of the tread meets a sudden resistance, it spreads out laterally, away from the central plane of the rings, producing a distortion of the folds that precedes or accompanies the displacement of the floating ring, thus making the shock and strain less violent. The fold, therefore, is preferably vulcanized to a mean curvature and to a certain rigidity, so that it will not be permanently deformed, or be strained beyond the limits of elasticity, by the applied stresses. This rigidity is proportional to the weight and driving torque of the vehicle.

The connection may be made of any suitable material, and several embodiments of my invention have been shown, but I do not wish to be limited to the details thereof, since changes may be made therein within the scope of the appended claims.

I claim:

1. A resilient tire having normally spaced rigid rings, bendable connections connecting the rings and separate from them and arranged around the circumferences of both sides of the said rings, said connections coming down on the sides of said outer rigid ring and flaring sharply outwardly with respect to the central plane of said rings, said connections being vulcanized to permanent mean normal shape, and remaining outwardly bent when the load is applied and at all times, so that the strains in that part of said connections between said rings are always of a bending nature.

2. A resilient tire having normally spaced rigid rings, a cover separate from said rings and connecting them, said cover coming down on the sides of said outer rigid ring and having folds around the circumference of both sides of the rings flaring sharply outwardly with respect to the central plane of said rings, and vulcanized to permanent mean normal shape, and remaining outwardly bent when the load is applied and at all times so that the strain in that part of the tire between said rings is always of a bending nature.

3. In resilient tires having normally spaced rigid rings, a cover connecting the rings and separate from them, said cover coming down the sides of said outer rigid ring, and having continuous folds around the circumference of both sides of the rings and at the sides of the same, said folds being sharply bent outwardly from the sides of the rings, and vulcanized to permanent mean normal shape, and remaining outwardly bent when the load is applied and at all times so that the strain in that part of the tire between said rings is always of a bending nature.

4. A resilient tire having normally spaced rigid rings, bendable connections connecting the rings and separate from them and arranged around the circumferences of both sides of the said rings, said connections coming down on the sides of said outer rigid ring and flaring sharply outwardly with respect to the central plane of said rings, said connections being vulcanized to permanent mean normal shape and remaining outwardly bent when the load is applied and at all times, so that the strain in that part of said connection between said rings is always of a bending nature, said outer ring being provided with strengthening ribs extending inwardly and substantially radially therefrom, that portion of said connections adjacent said strengthening ribs being freely movable with respect thereto and having an internal layer of fabric adjacent said strengthening ribs.

5. A resilient tire having normally spaced rigid rings, one of said rings acting as a stretching ring and the other acting as a floating ring, the stretching ring having curved edge portions and extending laterally outwardly, and the floating ring being provided with strengthening ribs extending inwardly and radially therefrom, the outer faces of said ribs being inclined with respect to the central plane of said rings, a cover connecting the rings and having a tread, said cover having folds around the circumferences of both sides of the rings, vulcanized to permanent mean normal shape, and laterally bent sharply outwardly with respect to the central plane of the rings, said folds maintaining their outward flare when the load is applied and at all times, whereby the strains therein are of a bending nature, the portions of said folds adjacent said ribs having an internal layer of fabric and being normally spaced from the adjacent faces of said ribs and freely movable with respect thereto.

6. A resilient tire having normally spaced rigid rings, a cover consisting of a single envelop of suitable fabric separate from said rings and extending around them, said cover having a rubber tread portion at the outside of the outer ring, and side portions of rubber united with the said fabric, the rubber in said side portions being on that side of the fabric opposite to said rings, the side portions of said cover intermediate the rings being laterally and outwardly and sharply bent with respect to the central plane of said rings, said side portions being vulcanized to permanent mean normal shape, and maintaining said outward flare when the load is applied and at all times.

7. A resilient tire having normally spaced rigid rings, bendable connections connecting the rings and separate therefrom, and arranged around the circumferences of both sides of the said rings, said connections flaring sharply outwardly with respect to the central plane of the said rings, said connections being vulcanized to permanent mean normal shape and remaining outwardly bent when the load is applied and at all times, so that the strains are always of a bending nature, said connections between the rings consisting of a continuous outer layer of rubber and a continuous internal layer of fabric.

8. A resilient tire having normally spaced rigid rings, bendable connections connecting the rings and separate from them and arranged around the circumferences of both sides of the said rings, that portion of said connections intermediate said rings flaring sharply laterally with respect to the central plane of the said rings, that portion of said connections adjacent one of said rings having an internal fabric layer extending laterally on both sides of said ring and extending sharply and laterally therefrom, said fabric layer partaking of the bending movement of the said connections and stiffening said connections laterally.

9. A resilient tire having normally spaced rigid rings, bendable connections connecting the rings and separate from and having folds around the circumferences of both sides of said rings, flaring sharply outwardly with respect to the central plane of said rings, said folds being substantially symmetrical and U-shaped and having the peak of the U normally substantially midway between said rings, said folds being vulcanized to permanent mean normal shape, and remaining outwardly bent when the load is applied and at all times, so that the strains in said folds are always of a bending nature.

10. A resilient tire having normally spaced rigid rings, bendable connections connecting the rings and separate from them and arranged around the circumferences of both sides of said rings, that portion of said connections intermediate said rings having stiffening fabric and flaring sharply laterally with respect to the central plane of said rings, said connections being vulcanized to permanent mean normal shape, and remaining outwardly bent when the load is applied and at all times, so that the strains in that part of said connections intermediate said rings are always of a bending nature.

In testimony that I claim the foregoing as my invention, I have signed my name in presence of two subscribing witnesses.

TITO LIVIO CARBONE.

Witnesses:
C. P. GOEPEL,
F. HOGG.

Copies of this patent may be obtained for five cents each, by addressing the "Commissioner of Patents, Washington, D. C."